United States Patent
Ter-Hovhannissian

(10) Patent No.: US 7,237,932 B2
(45) Date of Patent: Jul. 3, 2007

(54) VEHICLE AND TRAILER LIGHTING SYSTEM

(75) Inventor: Artak Ter-Hovhannissian, Sun Valley, CA (US)

(73) Assignee: American Superlite, Inc., Sun Valley, CA (US)

( * ) Notice: Subject to any disclaimer, the term of this patent is extended or adjusted under 35 U.S.C. 154(b) by 207 days.

(21) Appl. No.: 10/968,394

(22) Filed: Oct. 18, 2004

(65) Prior Publication Data

US 2006/0083012 A1    Apr. 20, 2006

(51) Int. Cl.
*B60Q 1/00* (2006.01)

(52) U.S. Cl. .................. 362/485; 362/487; 362/493

(58) Field of Classification Search ............... 362/485, 362/481, 487, 493
See application file for complete search history.

(56) References Cited

U.S. PATENT DOCUMENTS

| | | | | |
|---|---|---|---|---|
| 4,655,520 A * | 4/1987 | Cummings | .................. | 439/111 |
| 4,947,293 A * | 8/1990 | Johnson et al. | ............. | 362/485 |
| 5,782,549 A * | 7/1998 | Glatzmeier et al. | ......... | 362/485 |
| 6,276,634 B1 * | 8/2001 | Bodle | ....................... | 244/118.5 |
| 6,435,697 B1 * | 8/2002 | Simmons et al. | ............ | 362/219 |
| 7,128,442 B2 * | 10/2006 | Lee et al. | ................... | 362/278 |

* cited by examiner

*Primary Examiner*—Sandra O'Shea
*Assistant Examiner*—Anabel Ton
(74) *Attorney, Agent, or Firm*—Kelly Lowry & Kelley LLP

(57) ABSTRACT

A vehicle and trailer lighting system having an elongated track affixed to a vehicle or trailer. The track includes first and second channels. A lamp assembly is connected to the first channel and selectively positioned along the track. The second channel includes a conductive contact disposed therein. A lamp of the lamp assembly includes and electrical connector extending therefrom to physically contact the electrically conductive contact of the track.

17 Claims, 7 Drawing Sheets

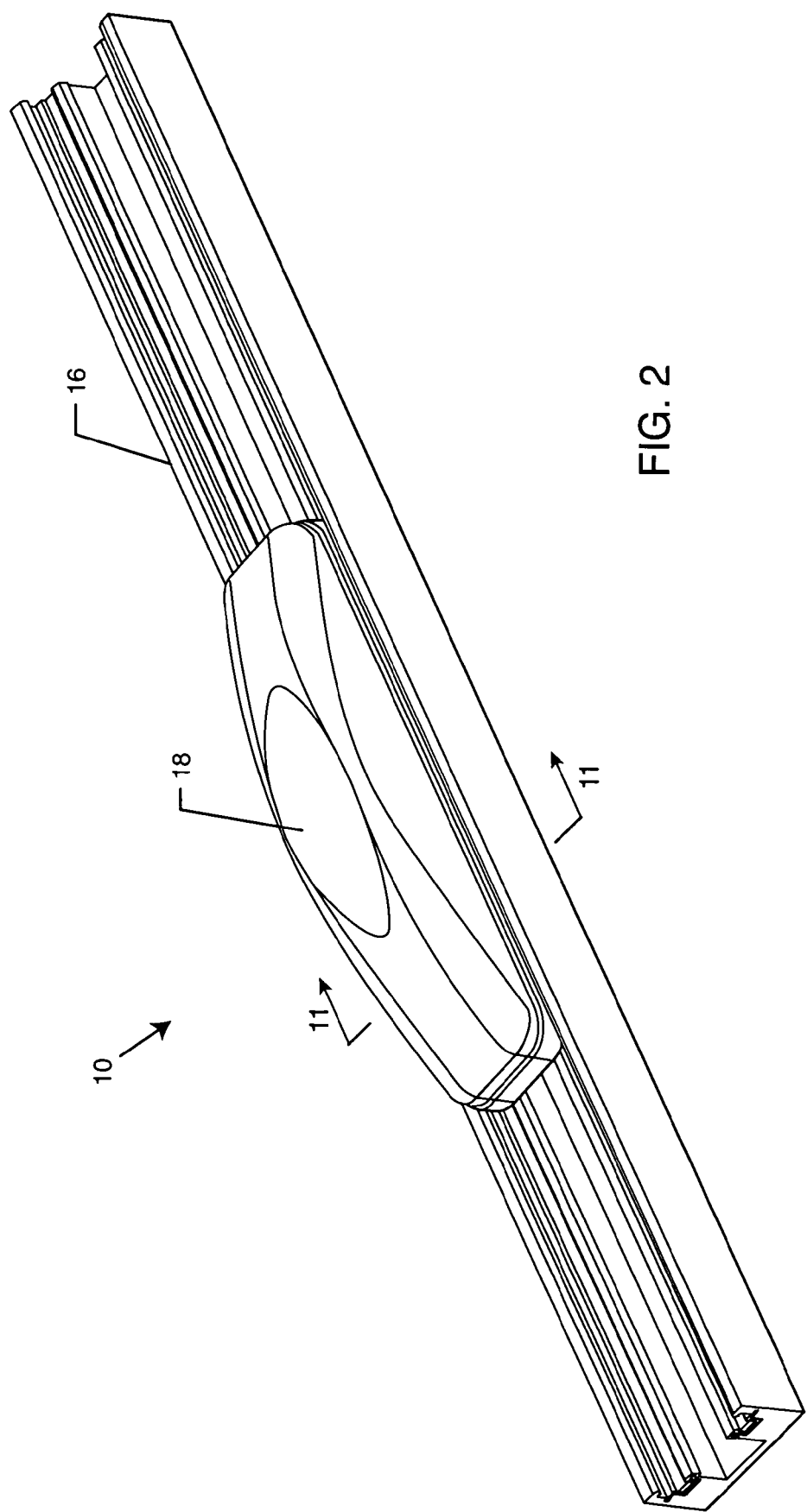

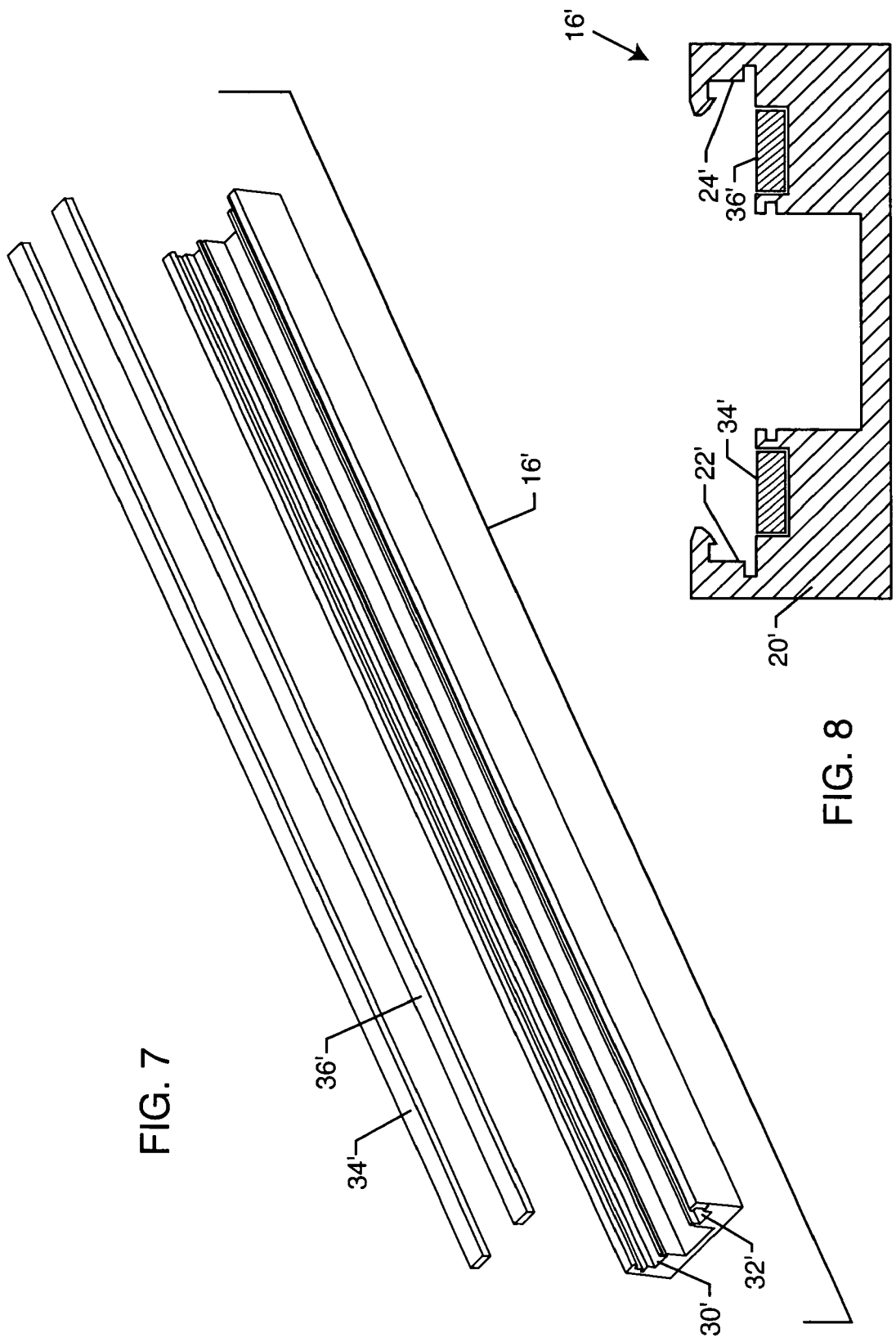

VEHICLE AND TRAILER LIGHTING SYSTEM

BACKGROUND OF THE INVENTION

The present invention generally relates to lighting systems for vehicles and trailers. More particularly, the present invention relates to a lighting system for use on heavy duty trucks and trailers which eliminates the need for individual light harnesses and wiring.

Heavy duty vehicles such as semi-truck trailers, large vans, busses and other vehicles and trailers require lighting systems to show the height, width and length of the vehicle or trailer. Such lights are referred to as clearance or marker lights and are mounted along the top and bottom of all three sides of the vehicle or trailer. Such marker and clearance lights are an important part of the safety of the vehicle and trailer, and are also mandatory according to the laws and regulations by DOT and NATSA.

The current light system on such trucks, trailers, etc., is comprised of a wire harness that is wired onto the body of the vehicle, and then the lights that are wired to the harness are mounted to the body of the vehicle or trailer. However, the current lighting system presents several drawbacks.

The first major problem is the corrosion of the wires of the lights and wire harnesses of the vehicle. Laboratory testing has shown that water seeps into the conductor under the insulation, corroding the wire in a rather short time. Of course, this renders the light inoperable.

Another problem with such lighting systems is that the wires are insulated with flexible and soft plastic, such as PVC. The wires tend to rub against the steel body of the trailer or vehicle and wear out, creating electric shorts. The wires are also subjected to many abuses, such as vibration, insulation drying and cracking, acid and harsh chemical washes, which can cause electric shorts. These electric shorts are very difficult to find. Thus, the entire lamp and harness assembly is often replaced.

Another major problem is the replacement of the burnt or damaged marker light. When a marker light is either broken or non-operational, it must be replaced. The current system does not allow rapid replacement of the light. Instead, drivers must remove the light, re-wire it, and then screw the light back on to the body of the vehicle or trailer. If a driver wants to add a completely new light to the vehicle, he is faced with the problem of cutting the harness of the vehicle, which voids the vehicle's electrical warranty. He then must drill a wire access whole and two screw holes to mount the light. Cutting and adding pig-tails is required to add more lights to the trailer or vehicle. It will be appreciated that this takes significant time, expedite and effort.

Accordingly, there is a continuing need for a vehicle and trailer lighting system which does not require trouble-shooting when the wire harness is broken, shorted or loose. Such a system should not require drilling unnecessary holes in the vehicle or trailing or the cutting and adding of pig-tail wires in order to add new lights. The wiring system should also be corrosion resistant and enable the attachment of additional lights in an easy manner. The present invention fulfills these needs and provides other related advantages.

SUMMARY OF THE INVENTION

The present invention resides in a vehicle and trailer lighting system generally comprising an elongated track affixed to a vehicle or trailer. An electrically conductive contact is associated with the track and operably connected to a source of electricity of the vehicle. A lamp assembly is selectively positionable along the track so as to be conductively coupled to the source of electricity via the track.

The track includes a first channel for receiving the lamp assembly, and a second channel having the electrically conductive conduct disposed therein. If the track comprises a conductive material, a non-conductive material, such as a sleeve, is disposed in the second track between the track and the electrically conductive contact. If the track is comprised of a non-conductive material, the electrically conductive contact is configured to be slidably received within the second channel.

In a particularly preferred embodiment, the track is comprised of a first set of substantially parallel and spaced apart channels adapted to receive generally opposite tongues or projections of the lamp assembly. First and second electrically conductive contacts are disposed in a second set of substantially parallel and spaced apart channels of the track.

The lamp assembly comprises a base having projections configured to be slideably received within the first channel, a lamp, and a lens positioned over the lamp. An electrical connector extends from the lamp so as to physically contact the electrically conductive contact.

In a particularly preferred embodiment, the lamp comprises at least one light emitting diode. A reflector is disposed between the light emitting diode (LED) and the lense. A LED may be disposed between the reflector and the base. An electrical connector extends from the at least one LED so as to physically contact the electrically conductive contact.

The track of the lighting system of the present invention is particularly adapted for use with semi-truck trailers. Thus, the track is attached to a cab portion of a semi-truck. The track may also be attached to the trailer so as to substantially surround the trailer. In such instances, corners of the track are electrically connected to one another. In a particularly preferred embodiment, upper and lower tracks which are generally parallel to one another surround upper and lower portions of the trailer.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 2 is a perspective view of an elongated track and lamp assembly embodying the present invention;

FIG. 7 is an exploded perspective view of another track embodiment of the present invention;

FIG. 8 is a cross-sectional view of an assembled track of FIG. 7;

DETAILED DESCRIPTION OF THE PREFERRED EMBODIMENTS

Figure 1:
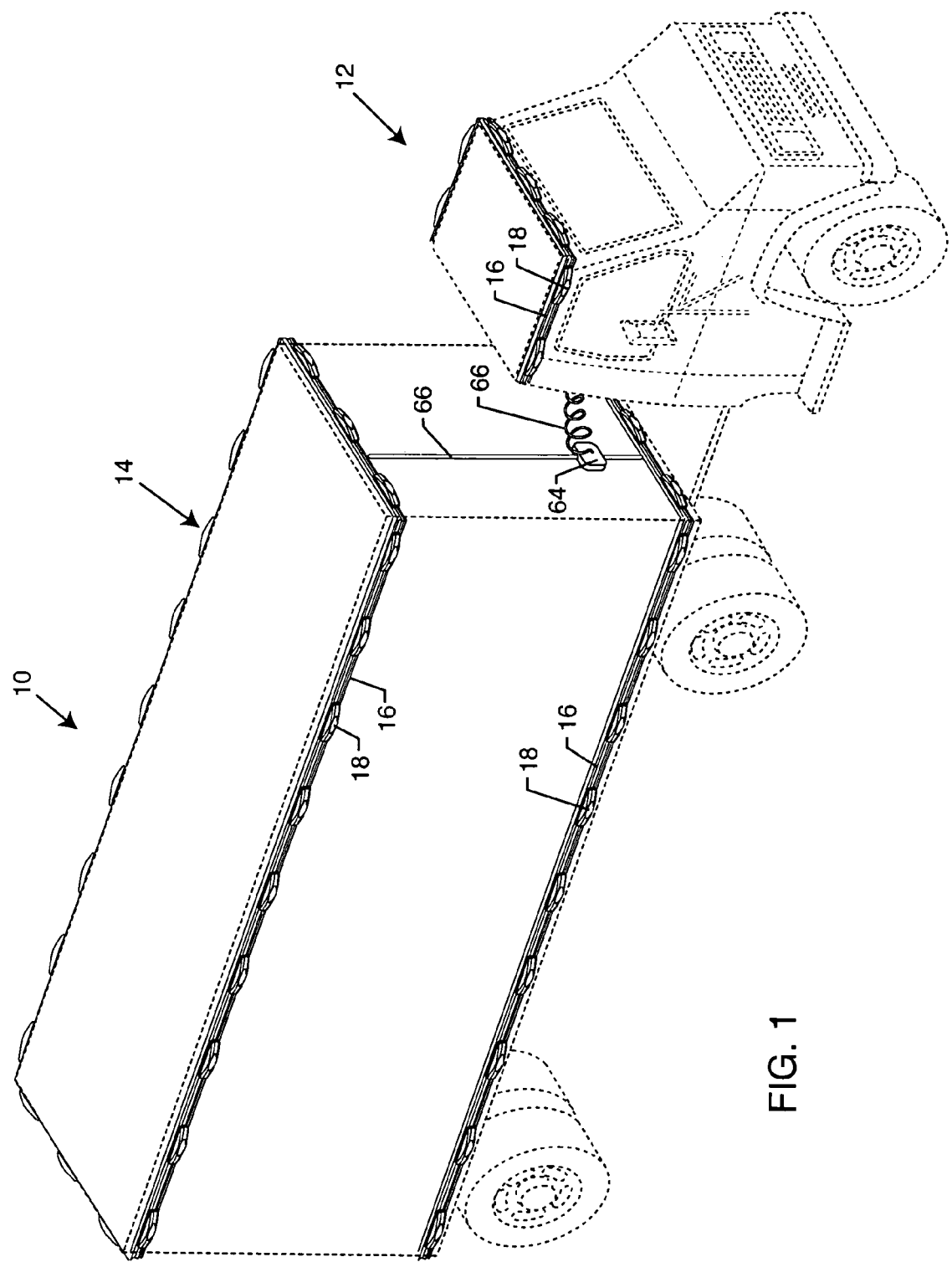
FIG. 1 is a perspective view of a semi-trailer, in phantom, having the vehicle and trailer lighting system of the present invention incorporated on a cab and trailer portion thereof.

As shown in the accompanying drawings for purpose of illustration, the present invention resides in a vehicle and trailer lighting system, generally referred to by the reference number 10, which is designed to avoid corrosion, electric shorts, and allow rapid and easy replacement of light assembly on the truck 12 or trailer 14. It will be understood by those skilled in the art, that although a semi-truck and trailer 12 and 14 are illustrated and used to describe the invention herein, the lighting system 10 of the present invention can be utilized in a great number of different trucks, trailers, vans, busses, etc., having clearance and marker lights and the like.

With reference now to FIG. 2, the system 10 of the present invention is generally comprised of a rail or track 16 and a lamp assembly 18. The track 16 and lamp assembly 18 are configured such that the lamp assembly 18 can be snap-fit or slid into the elongated track 16. As will be more fully described herein, the track 16 includes electrically conductive contacts for supplying electricity to the lamp assembly 18.

Figure 6:
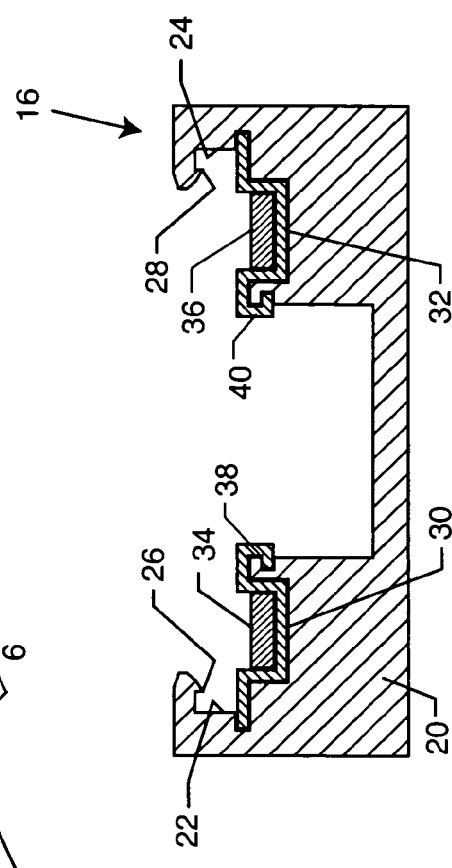
FIG. 6 is a cross-sectional view taken generally along line 6-6 of FIG. 3.
Figure 3:
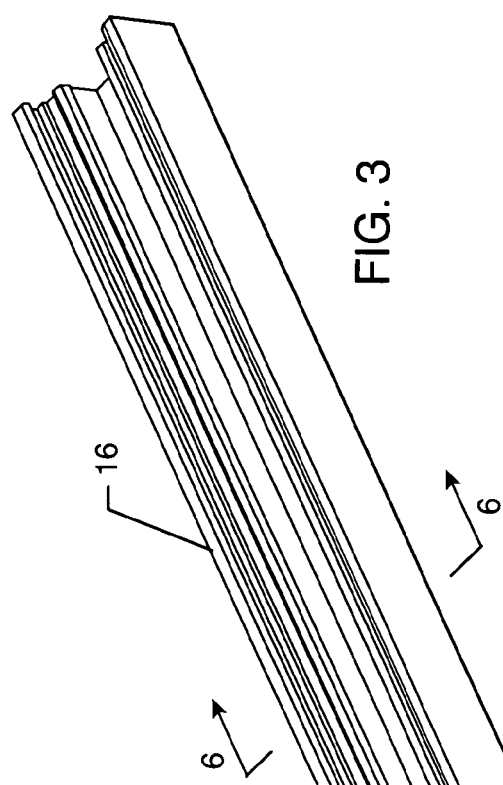
FIG. 3 is a perspective view of a track embodying the present invention.
Figure 5:
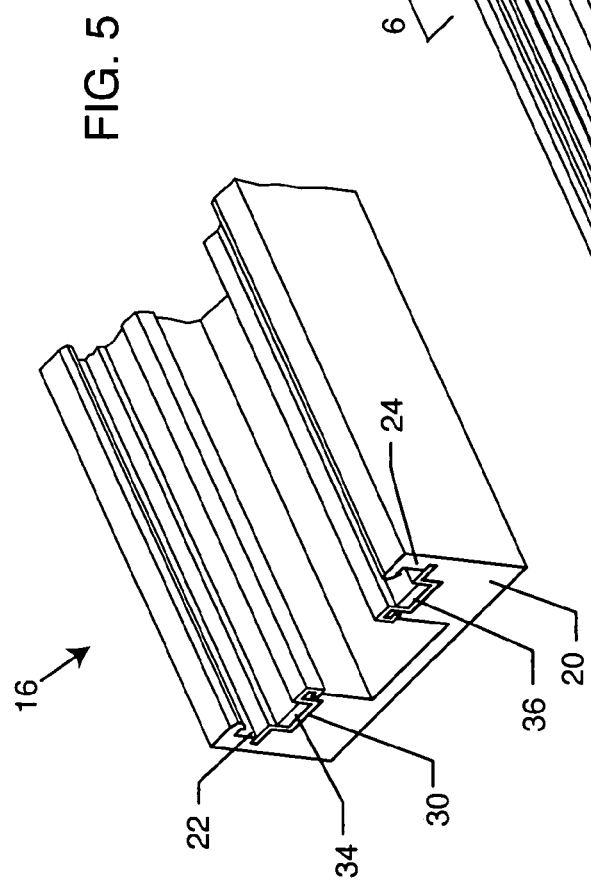
FIG. 5 is a partially fragmented perspective view of an end of the track of FIG. 3.

With reference now to FIGS. 3-6, a first particularly preferred embodiment of the track 16 is illustrated. In this embodiment, the track 16 itself is comprised of a durable and non-corrosive metal, such as aluminum or the like. The track 20 itself has various channels formed therein. In a particularly preferred embodiment, as illustrated, the track 20 includes a set of first open-faced grooves or channels 22 and 24. As can be seen in FIGS. 5 and 6, the open-faced channels 22 and 24 are directed inwardly so as to substantially face one another. Catches 26 and 28 are formed in the track 20 adjacent to the channels 22 and 24 so as to securely retain the lamp assembly 18 therein, as will be more fully discussed herein. A second set of open-faced grooves or channels 30 or 32 are formed in the track body 20 so as to face generally upwardly and be disposed generally parallel to one another.

Figure 4:
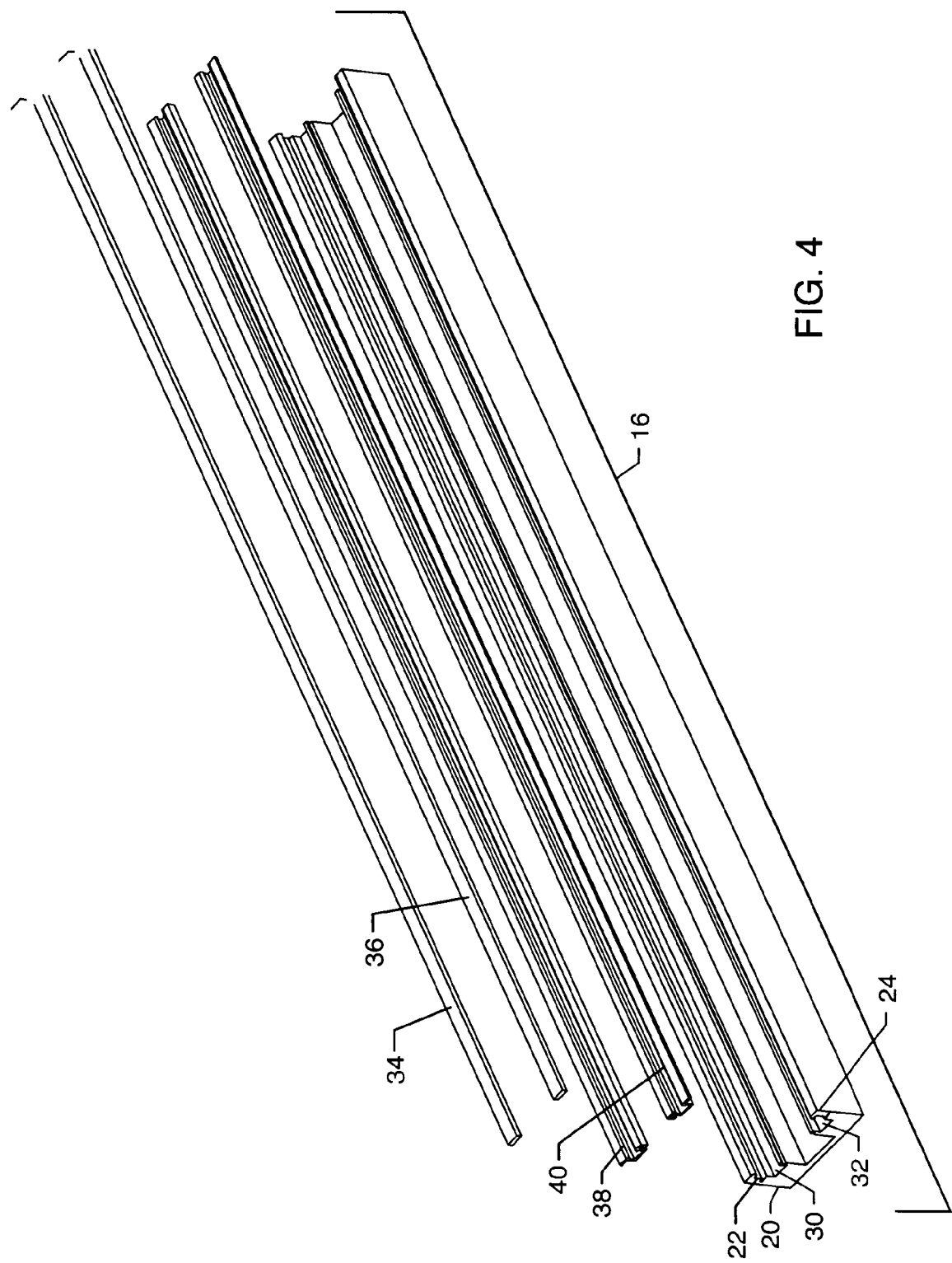
FIG. 4 is an exploded perspective view of the various component parts of the track of FIG. 3.

Electrically conductive contacts 34 and 36 are disposed within the second set of channels 30 and 32. As illustrated in FIG. 4, in particularly preferred embodiment, the conductive contact 34 and 36 comprise elongated railings having a width and thickness so as to be received within the channel 30 and 32.

To prevent possible electrical shorts between the conductive or semi-conductive track base 20 and the electrical contacts 34 and 36, an insulative material 38 and 40 is disposed between the electrical contact 34 and 36 and the track base 20. As illustrated in FIGS. 4 and 6, the insulative material 38 and 40 may comprise a sleeve which is configured to be snap-fit or slidably received in the second open-faced channels 30 and 32. Of course, it will be appreciated that the insulative material 38 and 40 could be an insulative resin applied to the channels 30 and 32 to insulate the electrical contacts 32 and 34 from the base track 20, as well as secure them in place in the channels 30 and 32. Other means of insulating the electrical contacts 34 and 36 are also contemplated by the invention.

With reference now to FIGS. 7 and 8, another particularly preferred embodiment of the track assembly 16' is illustrated. In this embodiment 16', the track base 20' is comprised of a non-conductive material, such as plastic or the like. The track base 20, similar to the embodiment described above, includes the inwardly facing grooves or channels 22' and 24'. The upwardly facing second channels 30' and 32' are also formed in the track body 20'. However, as there is no possibility of electrical shorts or the like between the conductive contact 34' and 36' and the non-conductive track base 20', thus the contact 34' and 36' can be inserted directly in the second channels 30' and 32'.

Figure 9:
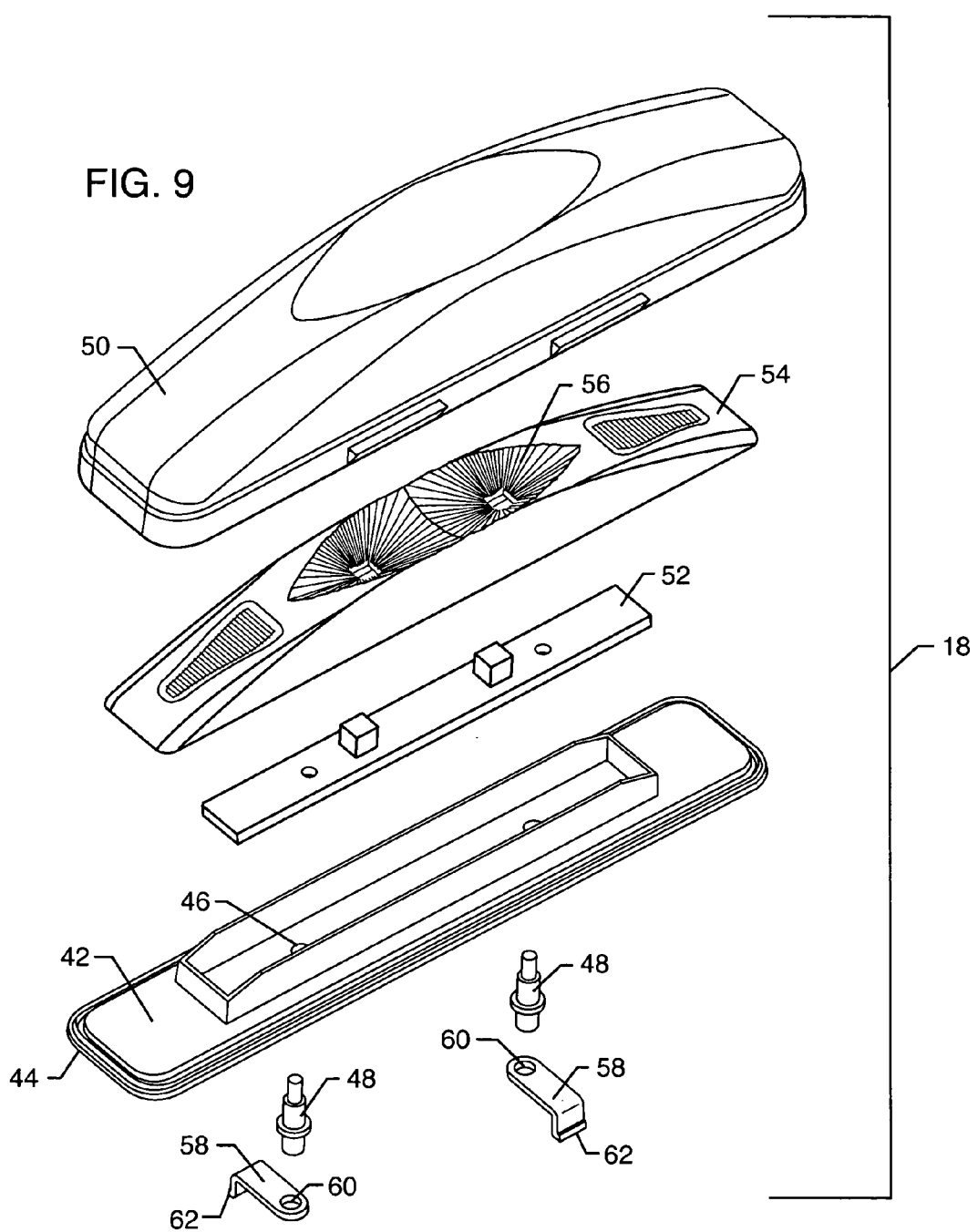
FIG. 9 is an exploded perspective view of a preferred lamp assembly embodying the present invention.
Figure 10:
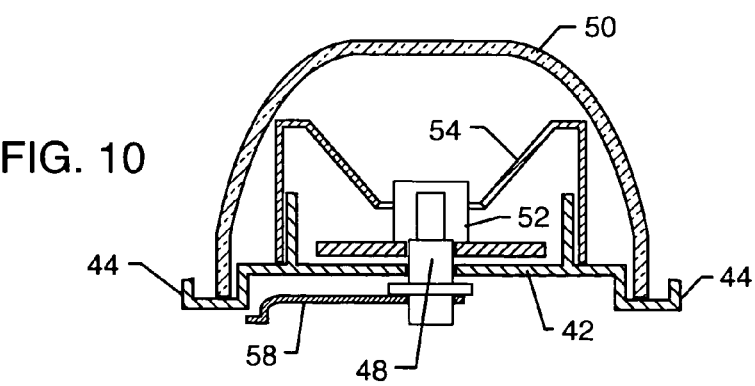
FIG. 10 is cross-sectional view of the assembly of FIG. 9.

With reference now to FIGS. 9 and 10, a particularly preferred lamp assembly 18 is illustrated, and will be described. The lamp assembly 18 includes a base 42 having tongues or projections 44 which are configured to be inserted into the first set of channels 22 and 24 of the track 16. The base 42 includes apertures 46 through which extends a lamp 48. The lamp 48 may comprise any type of lamp useful in such circumstances. However, in a particularly preferred embodiment, the lamp 48 comprises a light emitting diode (LED). It will be appreciated by those skilled in the art that the lamp 48 may also comprise a plurality of LEDs 48 or an array or cluster of LEDs. In any event, a lense 50 covers the base 42 and the one or more lamps 48.

In a preferred embodiment wherein a plurality of LEDs 48 are used, an LED cover 52 is disposed over the LEDs 48 and the base 42. The LED cover 52 can serve to protect the LEDs 48 from any possibility of moisture entering through the lens 50. The cover 52 can also be used to impart a color, such as orange, red, etc.

As LEDs emit a vary narrow stream of light, a reflector 54 is disposed adjacent to the LEDs 48 for disbursing the light emitted from the LEDs 48 and through the lens 50. In particular, the reflector 54 includes a plurality of serrations or ridges 56 immediately surrounding each LED 48 or cluster of LEDs, such that as the light is emitted, the light is reflected by the ridges 56 and through the lens 50. The lens 50 itself may also include ridges, reflective portions, etc., for disbursing the light from the LED 48.

Figure 11:
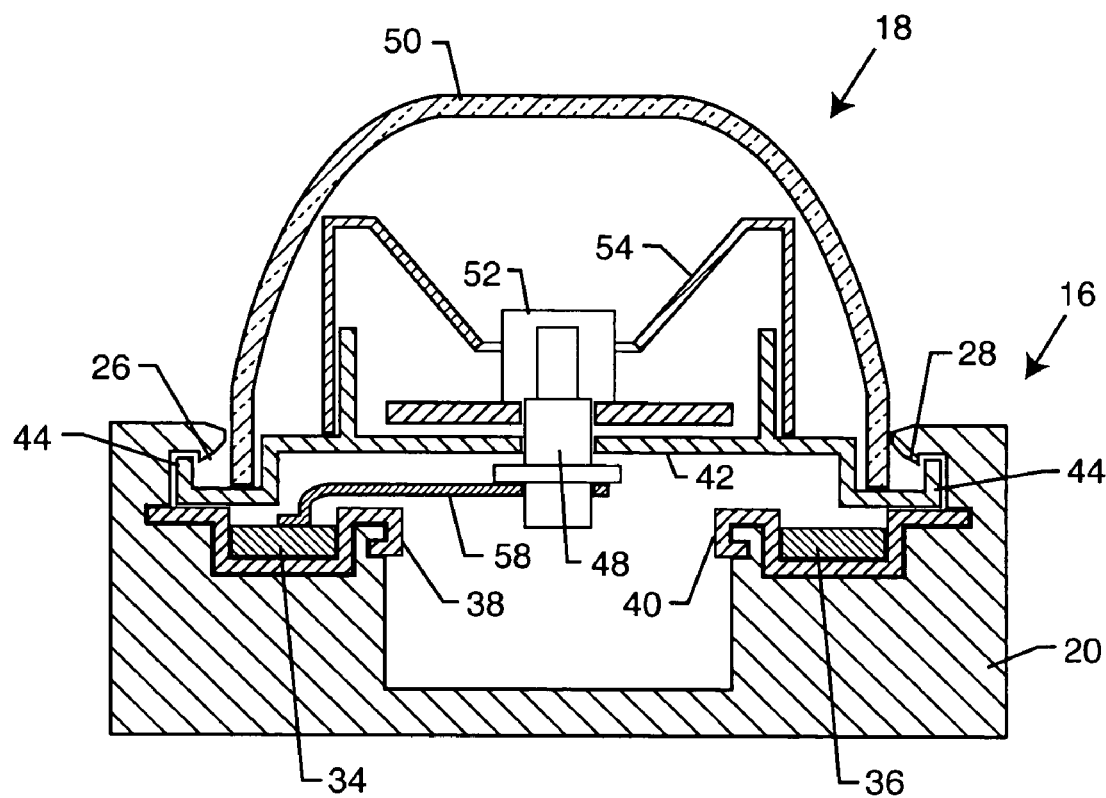
FIG. 11 is a cross-sectional view taken generally along line 11-11 of FIG. 2, illustrating connection of the lamp assembly and track to one another.
Figure 12:
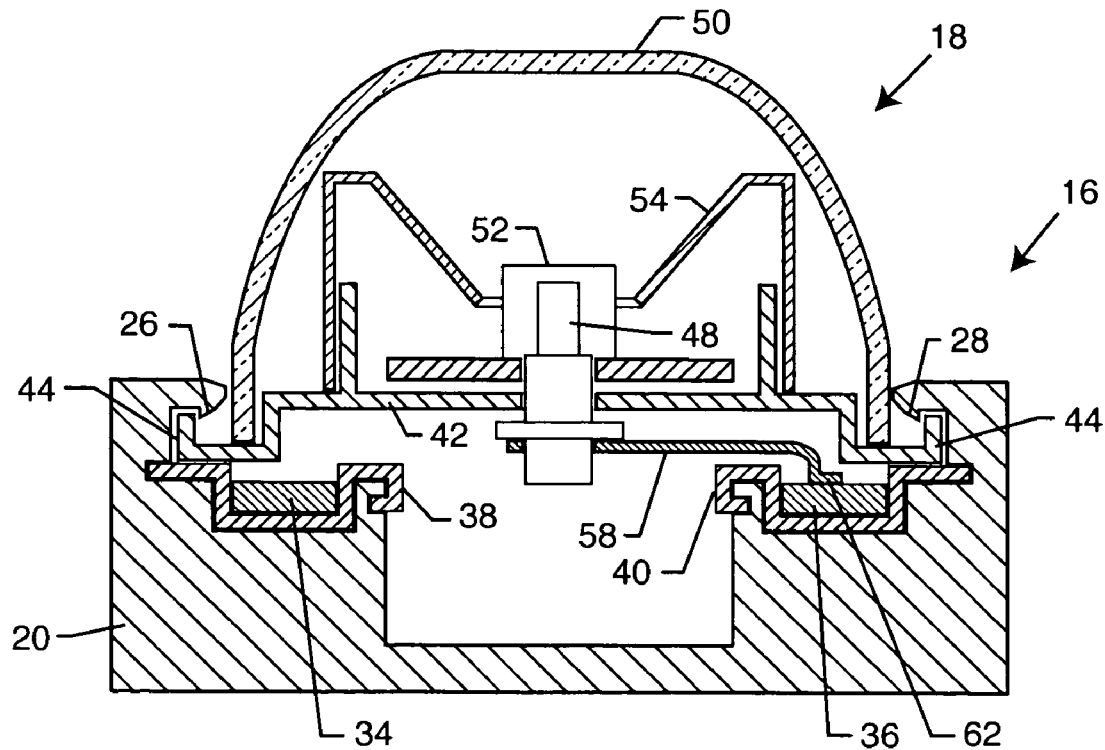
FIG. 12 is a cross-sectional view similar to FIG. 11, illustrating an electrical connector of the lamp moved to physically contact an opposite electrically conductive contact of the track.

An electrical connector 58 extends from the LED 48 and is configured so as to extend from the LED 48 to physically contact the electrically conductive contact 34 or 36 of the track assembly 16, as illustrated in FIGS. 11 and 12.

In a particularly preferred embodiment, the electrical connector or lead 58 includes an aperture 60 through which an end of the LED 48 is received. This creates an electrical connection between the lamp 48 and the electrical connector 58. The electrical connector 58 extends generally transverse to the primary axis of the LED 48 so as to extend over the electrically conductive contact 34 or 36 of the track assembly 16. A downward projection 62 physically contacts the conductive contact 34 or 36. In a particularly preferred embodiment, the electrical connector 58 can be swivelled so as to contact either of the conductive contacts 34 or 36.

With reference to FIG. 1, a source of electrical power 64 is electrically connected to the track 16 such that electricity is imparted to the electrically conductive contact 34 and 36. Typically, such electricity is provided by the battery of the vehicle (not shown) contained in the cab or truck portion of the vehicle. Thus, electrical wiring 66 extends from the battery or other source of electrical power to the track assembly 16. In the illustrated embodiment of FIG. 1, electrical leads 66 are conductively coupled to the electric contact 34 and 36 of the track assembly 16, such as by soldering or the like. The electrical lead 66 on a trailer 14 is then provide power through the power source 64, coupled to the battery or the like. In this manner, a simple plug-in connection is all that is necessary, as is currently the case with the electrical connection between the cab portion 12 and the trailer 14 of the semi-truck trailer.

With reference to FIGS. 1, 11 and 12, in a particularly preferred embodiment, when used on a semi-truck trailer, the elongated track 16 substantially surrounds upper and lower portions of the trailer 14. The track 16 can be made to substantially any length, and connected end-to-end or at corners. In the illustrated embodiment of FIG. 1, the track assemblies 16 are conductively coupled to one another at the corners of the trailer. Clearance marker lights are typically placed adjacent the top of the trailer 16 and the bottom of the trailer 14. Accordingly, the track assembly 16 of the present invention would be disposed at the top and bottom of the trailer 14. The lamp assemblies 18 are either slidably received within the track assembly 16, or more typically snap-fit into place. This enables their selective positioning and as many lamp assemblies 18 as are desired can be disposed along the length of a track assembly 16.

As illustrated in FIGS. 11 and 12, in the snap-fit arrangement, the base 42 of the lamp assembly 18 is preferably somewhat flexible and resilient in nature. Thus, the lamp assembly 18 can be pushed into the track assembly 16 such that the outer projections 44 of the lamp assembly base 42 are frictionally fit within the first set of open-spaced channels 22 and 24 such that the catches 26 and 28 hold them in place. So long as the electrical connector 58 extends in either one of two directions, that is straight up or straight down, it will be placed in physical contact with the electrically conductive contacts 34 and 36 of the track assembly 16, and provide electricity to the lamp 48.

Thus, the present invention, as will be appreciated by those skilled in the art, enables the quick and easy placement of lamp assemblies 18 along the length of a track assembly 16 without the time and expense of wiring, adding pig-tails, and drilling unnecessary holes in the truck or trailer. Due of the design of the system 10 of the present invention, there are no wires whose insulative sheets will be worn over time, crack, etc. and cause electrical shorts. In fact, the system 10 of the present invention is virtually corrosion free. The light assemblies 18 are easily snapped on to the track assembly 16 in any pattern or combination as desired.

Although an embodiment has been described in detail for purposes of illustration, various modifications may be made without departing from the scope and spirit of the invention. Accordingly, the invention is not to be limited, except as by the appended claims.

What is claimed is:

1. A vehicle and trailer lighting system, comprising:
   an elongated track fixed to a vehicle or trailer;
   an electrically conductive contact associated with the track and operably connected to a source of electricity from a battery or engine of the vehicle; and
   a lamp assembly selectively positionable along the track and conductively coupled to the source of electricity;
   wherein the track includes a first channel for receiving the lamp assembly, and a second channel having the electrically conductive contact disposed therein;
   wherein the track comprises upper and lower tracks attached to upper and lower portions of a trailer of a semi-truck so as to be generally parallel and substantially surround the trailer; and
   wherein the upper and lower tracks are both operably connected to the source of electricity, and a track attached to a cab portion of the semi-truck, wherein the tracks of the trailer and the track of the cab are electrically coupled to one another.

2. The system of claim 1, wherein the track comprises a conductive material, and a non-conductive material disposed between the track and the electrically conductive contact.

3. The system of claim 2, wherein the non-conductive material comprises an open-faced sleeve slidably received in the second channel and configured to receive the electrically conductive contact therein.

4. The system of claim 1, wherein the track is comprised of a non-conductive material, and the electrically conductive contact is configured to be slidably received within the second channel.

5. The system of claim 1, wherein the lamp assembly includes a lamp and an electrical connector extending from the lamp so as to physically contact the electrically conductive contact.

6. The system of claim 1, wherein the lamp assembly comprises a base having projections configured to be slidably received within the first channel, a lamp, and a lens positioned over the lamp.

7. The system of claim 6, wherein the lamp comprises at least one light emitting diode.

8. The system of claim 7, including an electrical connector extending from the light emitting diode so as to physically contact the electrically conductive contact.

9. The system of claim 7, including a reflector disposed between the light emitting diode and the lens.

10. The system of claim 9, including a light emitting diode cover disposed between the reflector and the base.

11. A vehicle and trailer lighting system, comprising:
    an elongated track fixed to a vehicle or trailer;
    an electrically conductive contact associated with the track and operably connected to a source of electricity; and
    a lamp assembly selectively positionable along the track and conductively coupled to the source of electricity;
    wherein the track includes a first channel for receiving the lamp assembly, and a second channel having the electrically conductive contact disposed therein; and
    wherein the lamp assembly comprises a base having projections configured to be slidably received within the first channel, a lamp comprising at least one light emitting diode, and a lens positioned over the lamp, and a reflector disposed between the light emitting diode and the lens.

12. A vehicle and trailer lighting system, comprising:
    an elongated track fixed to a vehicle or trailer;
    an electrically conductive contact associated with the track and operably connected to a source of electricity; and
    a lamp assembly selectively positionable along the track and conductively coupled to the source of electricity;
    wherein the track includes a first channel for receiving the lamp assembly, and a second channel having the electrically conductive contact disposed therein; and
    wherein the track is comprised of a first set of substantially parallel and spaced apart channels adapted to receive generally opposite tongues of the lamp assembly, and a second set of substantially parallel and spaced apart channels in which first and second electrically conductive contacts are disposed.

13. The system of claim 12, wherein the lamp assembly includes a lamp and a conductor extending therefrom adapted to selectively physically contact either the first or second electrically conductive contacts.

14. A vehicle and trailer lighting system, comprising:

an elongated track fixed to a vehicle or trailer;

an electrically conductive contact associated with the track and operably connected to a source of electricity; and a lamp assembly selectively positionable along the track and conductively coupled to the source of electricity;

wherein the track includes a first channel for receiving the lamp assembly, and a second channel having the electrically conductive contact disposed therein; and wherein the track comprises upper and lower tracks attached to upper and lower portions of a trailer of a semi-truck so as to be generally parallel, and wherein the upper and lower tracks are both operably connected to the source of electricity.

15. The system of claim 14, wherein the upper and lower tracks substantially surround the upper and lower portions of the trailer and are electrically connected at corners thereof.

16. A vehicle and trailer lighting system, comprising:

an elongated track fixed to a vehicle or trailer;

an electrically conductive contact associated with the track and operably connected to a source of electricity from a battery or engine of the vehicle; and a lamp assembly selectively positionable along the track and conductively coupled to the source of electricity;

wherein the lamp assembly comprises a base configured to be removable received within the track, a lamp comprising at least one light emitting diode, a lens positioned over the lamp, and a reflector disposed between the at least one light emitting diode and the lens.

17. The system of claim 16, wherein the track includes upper and lower tracks attached to upper and lower portions of a trailer of a semi-truck so as to be generally parallel, and wherein the upper and lower tracks are both operably connected to the source of electricity.

* * * * *